United States Patent
Tanaka et al.

[11] Patent Number: 6,022,913
[45] Date of Patent: Feb. 8, 2000

[54] CONTAINER FOR RETORT PACKAGING, RESIN COMPOSITION, AND GAS-BARRIER FILM PREPARED THEREFROM

[75] Inventors: Hideaki Tanaka; Hiroyuki Ohba, both of Niihari-gun; Tomoaki Sato, Tsuba; Tomohisa Hasegawa, Tsukuba, all of Japan

[73] Assignee: Kureha Chemical Industry Co. Ltd., Tokyo, Japan

[21] Appl. No.: 09/068,584

[22] PCT Filed: Sep. 5, 1997

[86] PCT No.: PCT/JP97/03131

§ 371 Date: Mar. 19, 1998

§ 102(e) Date: Mar. 19, 1998

[87] PCT Pub. No.: WO98/09813

PCT Pub. Date: Mar. 12, 1998

[30] Foreign Application Priority Data

Sep. 6, 1996 [JP] Japan .................................. 8-257514
Dec. 27, 1996 [JP] Japan .................................. 8-359297

[51] Int. Cl.[7] .......................... B32B 27/36; B65D 81/24; C08G 81/02; C08J 5/18
[52] U.S. Cl. .................. 524/27; 524/31; 524/32; 524/35; 524/47; 524/51; 525/54.24; 525/54.26; 525/55; 525/56; 525/57; 525/58; 525/59
[58] Field of Search ................................ 524/27, 31, 32, 524/35, 47, 51; 525/54.24, 54.26, 55, 56, 57, 58, 59

[56] References Cited

U.S. PATENT DOCUMENTS

| | | |
|---|---|---|
| 2,169,250 | 8/1939 | Izard . |
| 5,498,662 | 3/1996 | Tanaka et al. . |
| 5,552,479 | 9/1996 | Tanaka et al. . |
| 5,560,988 | 10/1996 | Oba et al. . |
| 5,574,096 | 11/1996 | Tanaka et al. . |
| 5,621,026 | 4/1997 | Tanaka et al. . |

FOREIGN PATENT DOCUMENTS

| | | |
|---|---|---|
| 665263 | 8/1995 | European Pat. Off. . |
| 4100913 | 4/1992 | Japan . |
| 4114043 | 4/1992 | Japan . |
| 4114044 | 4/1992 | Japan . |

*Primary Examiner*—Nathan M. Nutter

[57] ABSTRACT

The present invention provides a container for retort packaging comprising a laminated film having an outermost layer comprising a layer formed of a cross-linked structure containing ester bonds between poly(meth)acrylic acid (A) and polyalcoholic polymer (B); a resin composition having at least the chemical structures (X) [poly(meth)acrylic acid (A) residue], (Y) [poly(meth)acrylic acid (A)-polyalcoholic polymer (B) residue] and (Z) [metal cross-linked ionic residues], wherein the degree of esterification defined by the equation: degree of esterification=$c/(b+c+d)$ is from 0.01 to 0.5 and the degree of ionization defined by the equation: degree of ionization=$c/(b+c+d)$ is from 0.01 to 0.9 (wherein b, c and d represent the molar ratios of the carbon-oxygen double bond in the chemical structure of the resin composition; and a gas barrier film comprising the same.

9 Claims, No Drawings

CONTAINER FOR RETORT PACKAGING, RESIN COMPOSITION, AND GAS-BARRIER FILM PREPARED THEREFROM

This application claims priority under 35USC371 from PCT/JP97/03131, filed Sep. 5, 1997.

TECHNICAL FIELD

The present invention relates to a container for retort packaging composed of a specified film and a retort method using the same; and a resin composition and a film comprising the same having a gas barrier property, and a method for producing the same. In more detail, the present invention relates to a container for retort packaging being excellent in hot-water resistance and gas barrier property against oxygen and the like comprising a reaction product of poly(meth) acrylic acid and a polyalcoholic polymer and a retort method using the same, as well as to a resin composition comprising poly(meth)acrylic acid, polyalcoholic polymers and metals and a film being excellent in hot-water resistance, gas barrier property against oxygen and the like, especially in oxygen gas barrier property in a high humidity atmosphere, and a method for producing the same.

The film according to the present invention is not only excellent in hot-water resistance and oxygen gas barrier property but also is able to maintain a good oxygen gas barrier property even after a hot water treatment such as boiling and retort treatment. Therefor, it is suitable as a packaging material for articles, infusion solutions, foodstuffs and beverages that are susceptible to deterioration with oxygen. The film is especially suitable for use in containers for retort packaging since the oxygen gas barrier property is securely maintained even after the film is exposed to hot water or steam for retort treatment.

BACKGROUND ART

PVA and poly(meth)acrylic acid and partially hydrolyzed products thereof are water soluble polymers, being widely used for water adsorbents, thickeners, flocculants, dispersants and treatment agents for paper and textiles. Poly(meth) acrylic acid or its partially neutralized product can be formed into a film by casting from its solution and the film obtained has an excellent gas barrier property under dry conditions. However, since this film is strongly hydrophilic, the gas barrier property is remarkably lost under high humidity circumstances besides being readily dissolved in water. Accordingly, this film is not suitable for packaging of foodstuffs containing a large amount of moisture.

While films made of starch and its derivatives have a good oil resistance and oxygen gas barrier property, on the other hand, they have a drawback that their mechanical strength is weak and water resistance is poor. Starch is one of the natural polysaccharides available in plants, its constituents being composed of linear amylose in which glucose units are linked by $\alpha$ (1–4) bonds and high molecular weight amylopectin in which multiple short amylose chains are branched with each other via $\alpha$ (1–6) bonds. Starch and its derivatives include, in addition to crude starch, processed starch, e.g., physically modified starch, such as purified starch, chemically modified starch prepared by hydrolysis of starch with an acid or enzyme, or by heating to enhance solubility in cold water, graft-modified starch obtained by graft polymerization with monomers such as acrylamide, acrylic acid, vinyl acetate or acrylonitrile. These modified starch derivatives are hydrophilic polymers, similarly to poly(meth)acrylic acid and, therefore, are used in a wide range of industrial fields, including not only in food industries but also for water adsorbents, thickeners, flocculants, dispersants and processing agents for paper and textiles by taking advantage of their hydrophilic property. The substance having good water solubility of these starch derivatives can be readily formed into a film by casting from an aqueous solution. However, films made of starch derivatives are not suitable for use in packaging of food stuffs because the films are so strongly hydrophilic that their oxygen gas barrier property is remarkably lost under high humidity conditions.

When PVA films are used for the purpose where a practical oxygen gas barrier property is required, it was attempted to diminish the effect of humidity as much as possible by forming the film into a laminated film of PVA films with other films having two or more of multiple layers. However, since forming into laminated films is not a sufficient countermeasure with respect to moisture resistance and water resistance, it is desired to endow the PVA film itself with water resistance along with sufficient oxygen gas barrier property in a high humidity environment.

U.S. Pat. No. 2,169,250 proposes a method for making films and textiles, formed from a mixed aqueous solution of PVA and a polycarboxylic acid followed by heating, insoluble in water by forming a cross-linked structure by allowing hydroxyl groups of PVA to react with carboxylic groups. Several methods for producing films and sheets from a mixture of starch and its derivatives and a variety of thermoplastic resins have been also proposed. A biodegradable film comprising PVA polymers and starch derivatives is described in Japanese Unexamined Patent Publication No. 4-100913 and Japanese Unexamined Patent Publication No. 4-114044. Japanese Unexamined Patent Publication No. 4-114043 discloses a water resistant composition comprising PVA polymers and polysaccharides and a film made of the composition. According to the examination by the inventors of the present invention, however, more improvements with respect to the oxygen gas barrier property in a high humidity environment are desired for practical purposes in the packaging of foodstuffs whose ingredients contain a lot of moisture.

The investigators of the present invention have proposed, in Japanese Unexamined Patent Publication No. 7-102083, a film formed of a mixture of polyvinyl alcohol and partially neutralized product of poly(meth)acrylic acid having an excellent water resistance and oxygen gas barrier property. Japanese Unexamined Patent Publication No. 7-165942 has proposed a film formed of a mixture of a poly(meth)acrylic acid polymer, selected from poly(meth)acrylic acid and partially neutralized products of poly(meth)acrylic acid, and saccharide, wherein the film is excellent in water resistance and oxygen gas barrier property.

Japanese Unexamined Patent Publication No. 7-205379 has proposed a multilayer gas barrier laminated film, containing a film insoluble in water and excellent in oxygen gas barrier property as a gas barrier layer formed of a mixture containing vinyl alcohol and poly(meth)acrylic acid or a partially neutralized product of poly(meth)acrylic acid, and a method for producing the same; while Japanese Unexamined Patent Publication No. 7-251485 has proposed a multilayer gas barrier laminated film, containing a film excellent in water resistance and oxygen gas barrier property as a gas barrier layer, formed of a mixture containing poly(meth) acrylic acid and/or a partially neutralized product of poly (meth)acrylic acid and saccharide, and a method for producing the same. The investigators have studied to effectively make use of water resistance and gas barrier property involved in these films.

The object of the present invention is to provide a container for retort packaging being resistant to high temperature steam and hot water (hot-water resistance) and being excellent in gas barrier property, wherein the oxygen gas barrier property is not changed after being subjected to a hot-water treatment or is not decreased below the level before the hot-water treatment, and a retort method using the same. Another object is to provide a specified resin composition and a gas barrier film comprising the same, and a method for producing the same.

DISCLOSURE OF INVENTION

The investigators of the present invention found that the container for retort packaging becomes hot-water resistant and excellent in oxygen barrier property without being more deteriorated than before heat treatment by a retort treatment of the container, comprising a laminated film composed of a layer formed of a cross-linked structure containing ester bonds between poly(meth)acrylic acid (A) and polyalcoholic polymers (B) as an outermost layer, in water (for example, city water) containing metals, thereby completing the present invention.

The first embodiment of the present invention provides a container for retort packaging comprising a laminated film having an outermost layer comprising a layer formed of a cross-linked structure containing ester bonds between poly (meth)acrylic acid (A) and a polyalcoholic polymer (B), and a packaged article packed and packaged in the package container. By combining with the retort method according to the present invention, a container for retort packaging and retort packaged articles being excellent not only in hot-water resistance but also in oxygen barrier property are provided, wherein the oxygen barrier property is not changed after being subjected to a hot-water treatment or not deteriorated below the level before subjecting to a hot-water treatment.

The second embodiment of the present invention provides a retort method characterized by treating the container for retort packaging described above in water containing a metal (C). Metal ions permeate into the outermost layer of the container for retort packaging according to the first embodiment of the present invention during the retort treatment to form salts with free carboxylic acids of poly(meth)acrylic acid by the retort method according to the second embodiment of the present invention, forming a new ionic cross-linked structure in addition to the cross-linked (cross-linking by ester bonds) structure existing in the outermost layer according to the first embodiment. As a consequence, the container for retort packaging turns into a container for retort packaging being excellent not only in hot-water resistance but also in oxygen barrier property, wherein the oxygen barrier property is not changed after being subjected to a hot-water treatment or not deteriorated below the level before subjecting to a hot-water treatment.

The third embodiment according to the present invention provides a resin composition having at least the chemical structures (X), (Y) and (Z) and, optionally, chemical structure (Z$^1$), described below, wherein the degree of esterification defined by the equation (1) is from 0.01 to 0.5 and the degree of ionization defined by the equation (2) is from 0.01 to 0.9:

chemical structure (X):

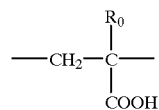

wherein $R_0$ represents H or $CH_3$;

chemical structure (Y):

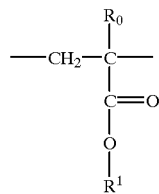

wherein $R_0$ represents H or $CH_3$, and $R^1$ represents a residue of a polyalcoholic polymer;

chemical structure (Z):

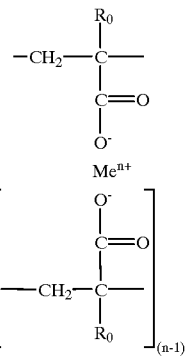

chemical structure (Z$^1$):

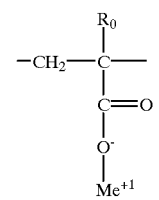

wherein each $R_0$ is, independently, H or $CH_3$, $Me^{n+}$ is a n-valent metal ion, $Me^{+1}$ is a monovalent metal ion, and n is 2 to 3;

Degree of esterification=$c/(b+c+d)$     (1)

Degree of ionization=$d/(b+c+d)$     (2)

wherein b, c and d represent molar ratios of carbon-oxygen double bonds in the chemical structure (X), (Y) and (Z) plus (Z$^1$), respectively, of the resin composition.

The fourth embodiment according to the present invention provides a resin composition comprising a reaction product using poly(meth)acrylic acid (A), polyalcoholic polymers (B) and metal ions (C) as starting materials, wherein the resin composition has at least chemical structures (X), (Y) and (z) described above, the degree of esterification defined by the equation (1) above being from 0.01 to 0.5 while the degree of ionization defined by the equation (2) above being from 0.01 to 0.9.

The fifth embodiment according to the present invention provides a gas barrier film comprising a resin composition according to the third embodiment of the present invention. The film according to the present invention is a film comprising a cross-linked structure being excellent in hot-water resistance and oxygen gas barrier property, wherein free carboxylic acid groups in the cross-linked structure comprising ester cross-linked structure (referred to as "ester cross-linking" in the present invention) formed by ester bonds between carboxylic acid groups in the poly(meth) acrylic acid (A) molecule and hydroxyl groups in the polyalcoholic polymer (B) molecule, or free carboxylic acid groups in the partially neutralized product of poly(meth) acrylic acid form ionic cross-linking with a metal (C).

The sixth embodiment according to the present invention provides a method for producing a gas barrier film comprising the resin composition according to the third embodiment of the present invention comprising the steps of (1) forming a film-like article mainly comprising poly(meth)acrylic acid (A) and a polyalcoholic polymer (B), (2) subjecting the film-like article to a heat treatment and (3) impregnating the heat-treated film in a medium containing a metal (C).

BEST MODE FOR CARRYING OUT THE INVENTION

The present invention will now be described in more detail hereinafter.

The "cross-linked structure" as used in the present invention refers to a structure of the resin composition or a film having the degree of esterification and degree of ionization measured by the method to be described hereinafter, being referred to an ester cross-linking and ionic cross-linking, respectively. Accordingly, the terms do not mean that the cross-linked structure was directly identified in the resin composition or film according to the present invention. When the carboxylic acid included in the film according to the present invention forms a salt with a monovalent alkali metal, for example, the film is expressed as a film having an ionic cross-linked structure provided that the film has a degree of ionization defined in the present invention. The esterification reaction may be termed as an ester cross-linking reaction.

Poly(meth)acrylic acid (A) as used in the present invention refers to an acrylic acid or methacrylic acid based polymer having two or more of carboxyl groups, being a general name including these carboxylic acid polymers and partially neutralized products of carboxylic acid polymers.

Examples of them include polyacrylic acid, polymethacrylic acid, a copolymer of acrylic acid and methacrylic acid, or a mixture of a plurality of them and their partially neutralized product. A copolymer of acrylic acid or methacrylic acid with their methyl or ethyl esters may be also used as far as they are soluble in water. A homopolymer of acrylic acid, methacrylic acid and a copolymer between them are preferable polymers. Among them, a homopolymer of acrylic acid and a copolymer of acrylic acid with methacrylic acid containing a dominant amount of acrylic acid are more preferable with respect to the gas barrier property. The preferable number average molecular weight of poly(meth)acrylic acid is, though not restrictive, in the range of 2,000 to 250,000.

The partially neutralized product of poly(meth)acrylic acid is obtained by partially neutralizing the carboxyl groups of carboxylic acid polymers of poly(meth)acrylic acid (i.e., forming carboxylic acid salts) with an alkali. Examples of alkali include alkali metal hydroxides such as sodium hydroxide, lithium hydroxide and potassium hydroxide, and ammonium hydroxide. The partially neutralized product can be usually obtained by adding an alkali in an aqueous solution of poly(meth)acrylic acid to react with each other. Accordingly, this partially neutralized product comprises alkali metal salts and ammonium salts. These alkali metal salts contribute to film formation according to the present invention as monovalent metal ions. Use of a partially neutralized product of poly(meth)acrylic acid is preferable since it may suppress coloring of the molded product due to heating. It is also preferable to use a mixture of poly(meth) acrylic acid and a partially neutralized product of poly(meth) acrylic acid.

A desired degree of neutralization can be achieved by adjusting the mixing ratio between poly(meth)acrylic acid and an alkali in obtaining a partially neutralized product of poly(meth)acrylic acid. It is preferable to select the degree of neutralization of poly(meth)acrylic acid based on the degree of oxygen gas barrier property of the gas barrier film as an end use product. The gas barrier property shows a tendency to be decreased when the degree of neutralization exceeds a certain level.

The degree of neutralization can be determined by the equation;

$$\text{degree of neutralization } (\%) = (N/N_0) \times 100$$

wherein N is the mole number of neutralized carboxylic groups in 1 g of partially neutralized polycarboxylic acid and $N_0$ is the mole number of carboxylic groups in 1 g of polycarboxylic acid before neutralization.

When poly(meth)acrylic acid (A) contains a partially neutralized product of poly(meth)acrylic acid, its degree of neutralization affects the reaction rate of the ester cross-linking reaction between poly(meth)acrylic acid (A) and polyalcoholic polymer (B). A preferable degree of neutralization of 20% or less is advantageous with respect to the film production speed since the ester cross-linking reaction rate between poly(meth)acrylic acid (A) and polyalcoholic polymer (B) is increased. When the degree of neutralization is more than 20%, the ester cross-linking reaction rate between poly(meth)acrylic acid (A) and polyalcoholic polymer (B) is decreased. It is more preferable that the degree of neutralization of the partially neutralized product of poly(meth)acrylic acid is 15% or less since the ester cross-linking reaction rate between two polymers becomes higher than the case when a non-neutralization product is used over a wide range of mixing ratios of two polymers, being advantageous with respect to the film production speed. From the view point of oxygen gas barrier property, the degree of neutralization of the partially neutralized product of poly(meth)acrylic acid is preferably 20% or less and more preferably 15% or less.

The polyalcoholic polymer(B) to be used in the present invention is an alcoholic polymer having one or more of hydroxyl groups in a molecule including PVA and starch. PVA preferably has a degree of saponification of 95% or more, more preferably 98% or more, and usually a number average molecular weight of 300 to 1,500. Monosaccharides, oligo-saccharides and polysaccharides are used as saccharides. These saccharides include sugar alcohols, various kinds of substituted compounds and derivatives, and cyclic oligo-saccharides such as cyclodextrin. These saccharides are preferably water soluble.

Starch and its derivatives to be used in the present invention, including polysaccharides described above, are crude starch (unmodified starch) such as wheat starch, corn starch, waxy corn starch, potato starch, tapioca starch, rice starch, sweet potato starch and sago starch as well as a variety of modified starches. Examples of modified starch include physically modified starch, starch modified with an enzyme, chemically decomposed and modified starch, chemically modified starch and graft starch subjected to graft-polymerization of starch with a monomer.

Water soluble modified starch such as roasted dextrin and reduced starch saccharification products whose reducing terminals are modified to alcohols are preferable ones of these starch and its derivatives. Starch may contain water. These starch and its derivatives are used alone or in a combination thereof.

The mixing ratio of poly(meth)acrylic acid (A) and polyalcoholic polymer (B) is 99:1 to 20:80, preferably 98:2 to 40:60 and more preferably 95:5 to 60:40 from the view point of having an excellent oxygen gas barrier property in a high humidity condition.

The methods for preparing a precursor composition of the present invention and for film casting according to the present invention will be described hereinafter.

The methods for preparing a precursor of poly(meth) acrylic acid (A) and a polyalcoholic polymer (B) include a method for dissolving each component in water, a method for mixing aqueous solutions of each component, a method for polymerizing an acrylic acid monomer in an aqueous solution of saccharide and a method for neutralizing with alkali after polymerization, if necessary. Poly(meth)acrylic acid forms a homogeneous solution with, for example, saccharide when they are dissolved in water together. A solvent such as alcohol, or a mixed solvent of, for example, water and alcohol may be used other than water.

An appropriate amount of water soluble metal salts of inorganic acids or organic acids may be added in preparing a mixed solution of both polymers for the purpose of enhancing the esterification reaction by a heat treatment of (A) and (B). Examples of metals to be used include alkali metals such as lithium, sodium and potassium. Examples of metal salts of inorganic acids or organic acids include lithium chloride, sodium chloride, potassium chloride, sodium bromide, sodium hypophosphite, hydrogen disodium phosphate, disodium phosphate, sodium ascorbate, sodium acetate, sodium benzoate and sodium hyposulfite. The amount of addition of metal salts of inorganic acids and organic acids is usually 0.1 to 20 parts by weight, preferably 1 to 15 parts by weight, against the solid fraction of both polymers in the mixed solution.

The methods for forming these precursor compositions into film-like articles include, though not restrictive, a method for flow-spreading an aqueous solution of a mixture on a substrate made of plastic or glass followed by drying to form film (a flow-spreading method), or a method for extruding an aqueous solution of the mixture in high concentration from a thin slit of an extruder forming a film while applying a high extrusion pressure, followed by drying the water containing film on a rotation drum or a belt (an extrusion method). Of these film forming methods, a flow-spreading method (cast method) is preferable since a dry film excellent in transparency can be easily obtained by the method.

The concentration of solid fractions is usually adjusted to 1 to 30% by mass when the flow-spreading method is used. Solvents other than water such as alcohol and a softening agent may be appropriately added, if desired, in preparing an aqueous solution or a solution dissolved in water. A plasticizer and heat stabilizing agent may be previously added to at least one of the components. The thickness of the film can be approximately determined depending on application purposes and is not restrictive, but it is usually 0.01 to 500 $\mu$m, preferably 0.1 to 500 $\mu$m and more preferably 0.1 to 100 $\mu$m. The thickness is usually 0.01 to 100 $\mu$m, preferably 0.1 to 50 $\mu$m, when the film is used for containers for retort packaging.

The film composition to be disposed at the outermost layer constituting the container for retort packaging according to the 1st embodiment of the present invention is composed of a cross-linked structure formed by ester bonds between poly(meth)acrylic acid (A) and polyalcoholic polymer (B).

The cross-linked structure according to the present invention is a cross-linked structure having ester bonds obtained by a heat-treatment of a film-like article comprising poly (meth)acrylic acid (A) and polyalcoholic polymer (B) under a specified condition. The presence of the ester bonds between (A) and (B) can be confirmed from IR spectrum (infra-red absorption spectrum) of a film obtained by a heat treatment of a film-like article comprising poly(meth)acrylic acid (A) and polyalcoholic polymer (B) under a specified condition. The IR spectrum enables to approximately determine the content of ester bonds formed.

The container for retort packaging according to the present invention is composed of at least two layers of laminated film comprising an outermost layer having a specified function and layers comprising a thermoplastic resin. Examples of the thermoplastic resin include, for example, polyethyleneterephthalate (PET); polyamide such as nylon 6, nylon 66, nylon 12, nylon and nylon 6/12 copolymer; polyolefins such as low density polyethylene, high density polyethylene, linear low density polyethylene, ethylene/vinyl acetate copolymer, polypropylene, ethylene/ acrylic acid copolymer, ethylene/acrylic acid salt copolymer and ethylene/ethyl acrylate copolymer; polyvinylidene chloride and polyphenylene sulfide.

Lamination methods known in the art such as coating method, dry lamination method and extrusion lamination method can be used, via or without an adhesive layer, for obtaining a laminated film with thermoplastic resin layers.

In the coating method (including flow-spreading method), a film-like article can be obtained by coating a solution of a mixture of poly(meth)acrylic acid and, for example, a saccharide on a layer of a thermoplastic resin with a desired thickness using an air knife coater, kiss-roll coater, metering bar coater, photogravure coater, reverse roll coater, dip coater or dye coater, or a combined device thereof, followed by evaporating the moisture in the film to dryness to form a film-like article by hot air blowing or infrared light irradiation using arch dryer, straight bath dryer, tower dryer, floating dryer or drum dryer, or a combined device thereof.

A gas barrier film (the outermost layer formed of the composition according to the present invention) is pasted on a film or sheet made of a thermoplastic resin with an adhesive in the dry lamination method. A molten thermoplastic resin is extruded on the gas barrier film to form a layer in the extrusion coating method.

A laminated film comprising an outermost layer having a specified function and a thermoplastic resin layer is obtained by heat-treating the thermoplastic resin layer on which a film-like article is formed under a specified condition using the drying apparatus described above. It is preferable to use heat resistant films such as oriented PET film, oriented nylon film and oriented propylene film as a thermoplastic resin layer from the view point of heat resistance in heat treatment under a specified condition. Especially, heat resistant films formed of thermoplastic resins having a melting point or Vicat softening point of 180° C. or more are more preferably used since the film can give laminated films closely adhered to the gas barrier film.

The melting point and Vicat softening point are measured according to JIS K7121 and JIS K7206, respectively.

It is preferable to use a material capable of heat sealing or high frequency sealing at the innermost layer (the layer at the side making a direct contact with packed articles) considering heat-adhesion in producing laminated containers.

Examples of resins capable of heat sealing include, for example, polyolefins such as low density polyethylene, linear low density polyethylene, high density polyethylene, ethylene/vinyl acetate copolymer, polypropylene, ethylene/acrylic acid copolymer, ethylene/acrylic acid salt copolymer and ethylene/ethyl acrylate copolymer; and nylon copolymer such as nylon 6/66 copolymer and nylon 6/12 copolymer. Examples of resins capable of high frequency sealing include polyvinyl chloride, polyvinylidene chloride, nylon 6 and nylon 66.

The laminated film-like article obtained is heat-treated for obtaining a laminated film having an outermost layer with a specified function formed of a specified composition described above. Heat treatment is carried out by the heat treatment conditions described in Japanese Unexamined Patent Publication No. 7-102083 and Japanese Unexamined Patent Publication No. 7-165942. When the polyalcoholic polymer (B) is a saccharide, the film-like article is heat-treated under a condition satisfying the heat treatment temperature and heat treatment time prescribed by the following equations (a) and (b).

$$\log t \geq -0.0622 \times T + 28.48 \quad (a)$$

$$373 \leq T \leq 573 \quad (b)$$

(t and T in the equation refer to a heat treatment time (minutes) and heat treatment temperature (°K), respectively)

By applying these heat treatment conditions, a film having an excellent oxygen gas barrier property can be obtained, wherein the oxygen gas permeation coefficient measured under a condition of 80% RH at 30° C. is $6.1 \times 10^{-18}$ mol.s.Pa ($5.00 \times 10_{-3}$ cm$^3$(STP).cm/m$^2$.s.atm) or less.

More preferably, a heat-treatment condition satisfying the following equation (c) instead of the equation (a) above may be used, wherein T satisfies the equation (b) above. A laminated film-like article having an oxygen gas barrier property and water resistance of the end use product can be obtained.

$$\log t \geq -0.0631 \times T + 29.32. \quad (c)$$

The heat-treatment conditions when the polyalcoholic polymer (B) is polyvinyl alcohol (PVA) are as prescribed in (a') and (b').

$$\log t \geq -0.0582 \times T + 26.06 \quad (a')$$

$$373 \leq T \leq 573 \quad (b')$$

(t and T in the equation refer to a heat treatment time (minutes) and heat treatment temperature (°K), respectively).

More preferably, a heat treatment condition satisfying the equation (c') below may be used instead of the equation (a') above, wherein T satisfies the equation (b') above. A laminated film having a gas barrier property and water resistance can be obtained by the heat treatment conditions (a') and (b').

$$\log t \geq -0.0564 \times T + 25.53 \quad (c')$$

This heat treatment can be carried out by placing, for example, a film or a laminate of a substrate and film in an oven kept at a prescribed temperature for a given time period. The heat treatment may be continuously carried out by allowing the laminate to pass through an oven kept at a prescribed temperature within a given time period.

A laminated film having a high level of gas barrier property in a high humidity circumstance can be obtained from a reaction product of poly(meth)acrylic acid (A) and polyalcoholic polymer (B) by this heat treatment. Moreover, this laminated film has a water resistant property besides being insoluble in water and boiling water.

A cross-linked structure is formed by the heat-treatment forming ester bonds (ester cross-linking) between carboxylic groups of poly(meth)acrylic acid (A) and hydroxyl groups of polyalcoholic polymer (B). Since the degree of ester cross-linking (degree of esterification) is measured by infrared light absorption spectroscopy mainly with respect to the surface of the film, at least a part of the film, or surface part, may exhibit the degree of esterification as described above (in other words, the inner part of the film need not show the degree of esterification described above).

Containers for retort packaging such as a bag (pouch), a standing pouch and a pillow can be produced by a heat-fusion between the innermost layers of the laminated film obtained by the heat-treatment while retaining only one end open and the laminated film obtained by the heat-treatment can be also used as a lid or bottom of a deep drawn container for retort packaging.

The laminated film constituting the container for retort packaging may be a dual layer, triple layer or multilayer. Appropriately selected existing film substrates for lamination may be used for the construction of the laminated film constituting the container for retort packaging according to the present invention depending on the physical properties required in the laminated film. For example, an oriented nylon film is selected when a strength is required while a polyester sealant or a polyethylene or polypropylene film produced by a polymerization using a metallocene catalyst is selected for the purpose of preventing odor from being adsorbed to the sealant of ingredients or preventing odor from being transferred from the sealant to the ingredients. Oriented films and easy-in-peal sealant are selected depending on the requirement for tearing property and easy-in-peal property of the film in opening the package. The total thickness of the laminated film is preferably 10 to 1000 µm, more preferably 20 to 800 µm. The thickness of the outermost layer is preferably 0.01 to 100 µm, more preferably 0.1 to 50 µm. The thickness of the thermoplastic resin layer adjoining to the outermost layer is preferably 5 to 900 µm, more preferably 5 to 800 µm. The thickness of each layer can be appropriately selected so that the total thickness becomes within the thickness described above. The container obtained can be used for a container for retort packaging having a hot water resistance, chemical resistance, mechanical strength, moisture resistance and gas barrier property. These containers are used for packaged articles for subjecting to retort treatment after packing and packaging foodstuffs.

Retort treatment may be carried out by conventional sterilization conditions, a temperature of 105 to 130° C. with a pressure of 0.3 to 1.7 kg/cm$^2$ for 1 to 40 minutes being preferable. It is also possible to subject to a boiling treatment at 100° C. or below.

The second embodiment relates to the 1st embodiment of the present invention where the container for retort packaging is treated in water containing a metal(C) or metal ion. The water to be used for the retort treatment should contain a metal (C). Although the content of the metal depends on the mass of the outermost resin component of the package to be subjected to the retort treatment, a content of 1 ppm or more is usually preferable considering the volume of hot water and mass of the package to be treated at once based on the volume of the retort tank used for the hot-water retort treatment. Divalent metal ions such as alkaline earth metal, zinc, copper, cobalt, nickel and manganese, or aluminum ion may be used as the metal (C). These metal ions may be provided as salts of halogen, hydroxide, oxide, carbonate, hypochlorite, phosphate, phosphite and hypophosphite, or organic acid salts such as acetate salt and (meth)acrylate salt. Of these salts, alkaline earth metals are preferably used. Of alkaline earth metal salts, magnesium and calcium are more preferable for practical purposes. Metal ions contained in city water or well water, or dissolved or suspended in water are used. The metal ions in the medium permeate into the film-like article after heat treatment, forming an ionic bond (ionic cross-linking) with free carboxylic acid originating from poly(meth)acrylic acid in the film-like article after heat treatment. Formation of ionic bonds and the degree of ionic bond can be confirmed by IR spectrum.

It is preferable that the gas barrier film disposed at the outermost layer of the laminate constituting the package container after the retort treatment exhibits an oxygen permeation coefficient of $5.1 \times 10^{-23}$ to $5.1 \times 10^{-20}$ mol/m.s.Pa (30° C., 80% RH). It is preferable to show a value of 0.01 to 10 cm$^3$(STP)/m$^2$.day.atm (30° C., 80% RH) expressed in terms of the oxygen gas permeability of the laminate used to construct the package container.

The resin composition according to the 3rd and 5th embodiments of the present invention and a gas barrier film comprising the same can be obtained by the steps comprising: heat-treating a film-like article formed of a precursor composition comprising foregoing poly(meth)acrylic acid (A) and polyalcoholic polymer (B) or a substrate on which the film-like article is coated; and forming cross-linking structure by ester bonds between poly(meth)acrylic acid (A) and polyalcoholic polymer (B) followed by cross-linking free carboxylic acids in poly(meth)acrylic acid (A) with the metal (C). The ionic cross-linked structure with the metal (C) is actually formed as follows.

After forming cross-linked structure by ester bonds between poly(meth)acrylic acid (A) and polyalcoholic polymer (B) by a heat treatment of a film-like article formed of a precursor composition comprising poly(meth)acrylic acid (A) and polyalcoholic polymer (B) or a substrate film on which the film-like article is coated, the film-like article or the substrate film on which the film-like article is casted is immersed in a medium, for example water, containing the metal (C). The metal ions in the medium permeate into the film-like article by immersion, forming ionic bonds (ionic cross-linking) with free carboxylic acids originating from poly(meth)acrylic acid in the film-like article after heat treatment. As a result, a gas barrier film according to the present invention formed of a resin composition composed of poly(meth)acrylic acid (A), polyalcoholic polymer (B) and metal (C) is obtained, wherein the resin composition has at least the foregoing chemical structures (X), (Y) and (Z), the degree of esterification defined by the equation (1) described above being from 0.01 to 0.5 while the degree of ionization defined by the equation (2) described above being from 0.01 to 0.9.

It is preferable to carry out the ionic cross-linking reaction by heating to facilitate ionic cross-linking. For example, the film-like article is immersed with heating in water or previously heated water in which metal ions are dissolved. The medium as used herein is not especially limited but any medium capable of forming ionic cross-link structure of metal ions in the film-like article may be used, examples of preferable media being water or an alcoholic aqueous solution. Water is preferable of these media for the practical purposes.

The same metals as used in the retort treatment described above may be used for the metal (C) to be used in the ionic cross-link treatment. The metal (C) may be used alone or as a mixture of a plurality of metals. City water or natural hard water may be preferably used for the immersion solvent since metal ions such as magnesium and calcium are contained in this water. An appropriate alkali metal hydroxide may be added for the purpose of adjusting the pH value of the aqueous solution. An aqueous solution of metal ions can be provided by dissolving the metals in water.

The concentration of the metal (C) in the solution, immersion temperature and immersion time is selected so that the degree of ionization of the gas barrier film according to the present invention as defined in the present invention is in the range of from 0.01 to 0.9, preferably from 0.1 to 0.9 and more preferably from 0.3 to 0.8. Preferable concentration of metal ions is in the range of 1 ppm to their saturation concentration. An immersion treatment time of as short as possible is desirable with respect to the industrial production speed of the film, a range of 1 second to 2 hours being preferable. A high immersion temperature by heating is preferable for accelerating the ionic cross-linking. While the temperature attainable by heating the medium containing a metal can be applicable as an upper limit temperature for immersion, usual immersion temperature is preferably 30° C. to 130° C., and more preferable temperature is 60° C. to 130° C. from the point of immersion treatment speed. A method for immersing the film in an aqueous solution of hydrochloric acid or sodium hydroxide or allowing the film to be swelled by immersing it in an aqueous solution of hydrochloric acid after an immersion treatment in an aqueous solution of sodium hydroxide may be applied as a pre-treatment for the purpose of making the metal ions easily permeate into the film. The preferable range of the degree of esterification of the end-use product is from 0.01 to 0.5, preferably from 0.05 to 0.5, with respect to the oxygen gas barrier property and hot water resistant property.

The gas barrier film comprising the composition according to the present invention has two cross-linking structures of a cross-linking structure (ester cross-linking) by ester bonds formed between poly(meth)acrylic acid (A) and polyalcoholic polymer (B) and a cross-linking structure by ionic bonds (ionic cross-linking structure) formed between free carboxylic acids originating in poly(meth)acrylic acid and metal ions as main constituents of the film, the proportion of these cross-linking structures in the resin being within a specified range. Since the degree of esterification and degree of ionization are mainly measured by an infrared light absorption spectroscopy to be described hereinafter mainly with respect to their surface parts, at least a part of the film, or at least their surface, may exhibit a degree of esterification and degree of ionization described above (in other words, it is not essential for the inner part of the film to exhibit the degree of esterification and degree of ionization described above).

The degree of ionization as used in the present invention refers to a ratio between all the carbon-oxygen double bonds originating in poly(meth)acrylic acid (A) in the film and the carbon-oxygen double bonds constituting anions of carboxylic acids as expressed in the foregoing equation (2). The carbon-oxygen double bonds originating in poly(meth) acrylic acid (A) according to the present invention exist in the chemical structures (x), (Y) and (z), the degree of ionization being expressed by the foregoing equation (2) provided that the molar ratio of carbon-oxygen double bonds in each chemical structure is a, b or c, respectively. This molar ratio was defined to be the degree of ionization (or degree of ionic cross-linking) in the present invention.

The degree of ionization can be actually determined by measuring infrared light absorption spectra of the film. The infrared light absorption spectrum can be measured using, for example FT-IR 1710 made by Perkin-Elmer Co. The C=O stretching vibration of carboxylic groups originating in poly(meth)acrylic acid (A) and of carbon-oxygen double bonds forming ester bonds are overlapped with each other giving an absorption spectrum having a peak around 1705 $cm^{-1}$ in a range of 1800 $cm^{-1}$ to 1600 $cm^{-1}$. The carbon-oxygen double bonds of carboxylic acid anions (—COO$^-$) originating in poly(meth)acrylic acid contained in the film according to the present invention give an absorption spectrum with a peak maximum of around 1560 $cm^{-1}$ in a range of 1600 $cm^{-1}$ to 1500 $cm^{-1}$.

The infrared light absorption spectrum of the film according to the present invention was measured by transmission method, ATR method (attenuated total reflection method) or KBr method, thereby calculating the degree of ionization of the film using a previously prepared calibration curve obtained from the area ratio or absorbance ratio at the maximum absorption wave number between the overlapped spectra of C=O bonds of esterified and free carboxylic groups and IR absorption spectra of C=O bond of ionized carboxyl groups as mentioned above.

The calibration curve as used herein is prepared as follows: Poly(meth)acrylic acid is previously neutralized with a given amount of sodium hydroxide. Then, infrared light absorption spectra of the samples thus prepared are measured by the transmission method, ATR method or KBr method with respect to the samples having different molar ratio of carbon-oxygen double bonds of carboxylic acid anions against total carbon-oxygen double bonds. The absorption area ratio, or absorbance ratio at the maximum absorption wave number between the C=O stretching vibration of carboxyl groups originating in poly(meth) acrylic acid and carboxylic acid anions is calculated using the absorption spectra obtained. Because the molar ratio between the total carbon-oxygen double bonds of the sample (poly(meth)acrylic acid) used herein and those of carboxylic acid anions is known, a calibration curve can be determined by a regression analysis of the relationship between the molar ratio and absorbance ratio or absorption area ratio calculated from the infrared light absorption spectra of the sample, obtaining the degree of ionization using this calibration curve. A representative measurement is carried out by ATR method using a reflection plate KRS-5 (thallium bromide-iodide crystal) with 30 times of integration and resolution of 4 $cm^{-1}$.

The degree of esterification (or degree of ester cross-linking) as used in the present invention refers to the molar ratio represented by the foregoing equation (1), wherein the ratio corresponds to the molar ratio between the total carbon-oxygen double bonds in the film according to the present invention and carbon-oxygen double bonds of the ester bonds in the chemical structure (Y) formed between poly(meth)acrylic acid (A) and polyalcoholic polymer (B).

The degree of esterification was actually determined by measuring infrared light absorption spectrum. Measurements of infrared light absorption spectrum were carried out using FT-IR 1710 made by Perkin-Elmer Co.

The C=O stretching vibration of the carbon-oxygen double bonds in carboxylic groups originating in poly(meth) acrylic acid (A) and that of the carbon-oxygen double bonds in the ester bonds contained in the gas barrier film according to the present invention give overlapped absorption spectra with each other, thereby being impossible to quantitatively distinguish the C=O stretching vibration originating in carboxyl groups from the C=O stretching vibration originating in the ester bonds. However, only the C=O stretching vibration of the carbon-oxygen double bonds forming ester bonds can be isolated by processing the infrared light absorption spectra of the film according to the present invention, enabling a quantitative assay by comparing the isolated absorption spectra with the absorption spectra containing both of C=O stretching vibration of ester bonds before isolation and C=O stretching vibration of free carboxylic acid. The methods comprises a peak separation methods to analyze the wave profile of the spectra or a differential spectroscopic method in which the absorption spectra of poly(meth)acrylic acid—a compound containing merely C=O double bonds originating in carboxyl groups—is subtracted (by multiplying by a coefficient, if necessary) from the infrared light absorption spectra of the film obtained.

The quantitative assay method of the degree of esterification will be described in more detail hereinafter.

(Measurement of infrared light absorption spectra)

Prior to measuring the infrared light absorption spectra, the film or resin layer to be measured is subjected to a pre-treatment. The sample to be measured is previously allowed to stand in an air-conditioned chamber at a temperature of 30° C. and relative humidity of 90% for 24 hours. Then, the sample is kept in an oven at a temperature of 105° C. for 1 hour. the latter heating and keeping operation is carried out to exclude the effect of water in the sample to be measured during infrared light absorption spectroscopic measurements. The former pre-treatment is carried out for the following reason: Acid anhydrides are formed between carboxylic acids contained in poly(meth)acrylic acid (A) as a main starting material of the film when a heat treatment is applied to prepare the film to be measured. The absorption spectrum of C=O stretching vibration of the acid anhydride formed overlaps with the absorption spectra of C=O stretching vibration originating in esters and free carboxylic acids to be used in the quantitative assay of the degree of esterification and degree of ionization as described hereinafter. In addition, the acid anhydride thus formed is so unstable that it returns to the free carboxylic acid by hydrolysis even at a condition of room temperature and atmospheric humidity. Consequently, the content of acid anhydrides may be different depending on the preservation conditions (temperature, humidity and time). Therefore, the former pre-treatment is applied in order to previously hydrolyze acid anhydrides in the sample to be measured. In the subsequent measurements, the sample to be measured is cut into a piece with a dimension of 1 cm×5 cm and the infrared light absorption spectra are measured by making the film to contact with a reflection plate.

Accordingly, the infrared light absorption spectra obtained by the measurement indicate that the chemical structure giving the absorption spectra exists at least on the surface of the film. KRS-5 (thallium bromide-iodide crystal) is used as a reflection plate in the attenuated total reflection (ATR) method with 30 times of integration at a resolution of 4 $cm^{-1}$.

The differential spectroscopic method and peak separation method will be now described in more detail (Differential spectroscopic method)

The infrared light absorption spectra (in a wave number range of 1850 $cm^{-1}$ to 1600 $cm^{-1}$) of the sample to be measured and poly(meth)acrylic acid are measured by the method described above. In the case of poly(meth)acrylic acid, the poly(meth)acrylic acid layer obtained by casting and drying an aqueous solution of 15% by mass of poly (meth)acrylic acid on a substrate such as a polyester film is used as a measuring sample. The two infrared light absorption spectra obtained correspond to the absorption spectrum of C=O stretching vibration of double bonds in carboxyl groups originating in poly(meth)acrylic acid and the absorption spectrum of C=O stretching vibration of double bonds in ester bonds with respect to the sample to be measured, and to the absorption spectrum of C=O stretching vibration of double bonds in carboxyl groups originating in poly(meth) acrylic acid with respect to the poly(meth)acrylic acid, respectively.

In the differential spectroscopic method, the absorption spectrum of the C=O stretching vibration of the carbon-oxygen double bonds in carboxyl groups originating in poly(meth)acrylic acid of the sample to be measured can be excluded by subtracting the infrared light absorption spectrum of polyacrylic acid (in the wave number region of 1850 $cm^1$ to 1600 $cm^{-1}$) from the infrared light absorption spectrum of the foregoing sample to be measured (in the wave number region of 1850 $cm^{-1}$ to 1600 $cm^{-1}$), thereby isolating the absorption spectrum of the C=O stretching vibration of the carbon-oxygen double bonds in ester bonds of the sample to be measured.

The arithmetic processing for obtaining the differential spectrum using an operational panel of the instrument (FT-IR 1710 made by Perkin-Elmer Co.) will now be described in more detail. The measured infrared light absorption spectra consist of a group of data points. In obtaining a differential spectrum between spectrum A and spectrum B, an absorbance difference at each absorption wave number between both spectra is calculated. A group of data (absorption wave number and absorbance difference) indicates the differential spectrum.

In the actual case, only the absorption spectrum of the C=O stretching vibration of the carbon-oxygen double bonds in carboxyl groups originating in poly(meth)acrylic acid should be subtracted from a spectrum in which the absorption spectrum of the C=O stretching vibration of the carbon-oxygen double bonds in carboxyl groups originating in poly(meth)acrylic acid and the absorption spectrum of the C=O stretching vibration of the carbon-oxygen double bonds in ester bonds of the sample to be measured are overlapped with each other. For this purpose, the arithmetic processing for obtaining the differential spectrum is carried out by multiplying the absorption spectrum of poly(meth) acrylic acid to be subtracted by a coefficient (an arbitrary positive numeral) so that the spectrum described above coincides with the absorption spectrum of C=O stretching vibration of the carbon-oxygen double bonds in carboxyl groups originating in poly(meth)acrylic acid contained in the spectrum of the sample to be measured. However, it is difficult to judge that the spectrum of poly(meth)acrylic acid multiplied by the coefficient is identical with the spectrum of C=O stretching vibration of the carbon-oxygen double bonds in the carboxyl groups originating in poly(meth) acrylic acid contained in the sample to be measured. Therefore, the coefficient for the differential spectrum was determined as follows in the present invention.

The differential spectrum is determined by subtracting the infrared light absorption spectrum (in a wave number range of 1850 $cm^{-1}$ to 1600 $cm^{-1}$) of poly(meth)acrylic acid after multiplying it by the coefficient from the infrared light absorption spectrum (in a wave number range of 1850 $cm^{-1}$ to 1600 $cm^{-1}$) of the sample to be measured. When the coefficient is gradually increased, the absorbance at a maximum absorption wave number (a maximum absorbance is usually observed at around 1700 $cm^{-1}$) of the infrared light absorption spectrum of poly(meth)acrylic acid (in a wave number range of 1850 $cm^{-1}$ to 1600 $cm^{-1}$) becomes lower than the base line of the spectrum (the line connecting the point at a wave number of 1850 $cm^{-1}$ with the point at a wave number of 1600 $cm^{-1}$ on the spectrum). In other words, the spectrum of poly(meth)acrylic acid multiplied by the coefficient becomes larger than the absorption spectrum of C=O stretching vibration of carboxyl groups originating in poly(meth)acrylic acid contained in the spectrum of the sample to be measured. By gradually decreasing the value of the coefficient, the absorbance at a maximum absorption wave number of poly(meth)acrylic acid of the differential spectrum in range of 1850 $cm^{-1}$ to 1600 $cm^{-1}$ can be made equal to the base line level. The spectrum thus obtained was used for determining the degree of esterification. This method is called "differential spectroscopic method".

The absorbance of the infrared light absorption spectrum of the maximum absorption wave number (in the range of 1850 $cm^{-1}$ to 1600 $cm^{-1}$) of poly(meth)acrylic acid becomes lower than the base line (a line connecting between the points at 1850 $cm^{-1}$ and 1600 $cm^{-1}$) of the spectrum. That is, the spectrum of poly(meth)acrylic acid multiplied by the coefficient becomes larger than the absorption spectrum of C=O stretching vibration of carbon-oxygen double bonds in carboxyl groups originating in poly(meth)acrylic acid included in the spectrum of the sample to be measured. Accordingly, the absorbance of the differential spectrum at 1700 $cm^{-1}$ is made equal to the base line by gradually decreasing the coefficient. The spectrum thus obtained was used for obtaining the degree of esterification. This method is called "a differential spectroscopic method".

(Peak resolution method)

FT-IR-8200 made by Shimadzu Seisakusho Co. having a peak resolution computing processing function as a Fourier transform infrared light absorption spectrophotometer was used in the peak resolution method. Infrared absorption spectra of films were measured using a similar ATR method and a peak resolution processing was applied to the spectra having a maximum absorption wave number of the film around 1705 $cm^{-1}$ in the range of 1800 $cm^{-1}$ to 1600 $cm^{-1}$ using the attached peak resolution software.

The peak area ratio between the isolated absorption spectrum of C=O stretching vibration originating in ester bonds and the absorption spectrum containing both of the C=O stretching vibration of ester bonds and C=O stretching vibration of free carboxyl groups existing before the isolation, or the corresponding absorbance ratio at the maximum absorption wave number is defined as a molar ratio R between "the carbon-oxygen double bonds forming ester bonds" and "the sum of the carbon-oxygen double bonds in free carboxylic acid and in ester bonds". Accordingly, the molar ratio R is expressed by the following equation:

$$R = (A_{C=O, ESTER})/[(A_{C=O, ESTER}) + (A_{C=O, FREE})]$$

($A_{C=O, ESTER}$) represents an absorbance area or absorbance at a maximum absorption wave number of the infrared light absorption spectrum of C=O stretching vibration in ester bonds while ($A_{C=O, FREE}$) represents an absorbance area or absorbance at a maximum absorption wave number of the infrared light absorption spectrum of C=O stretching vibration in free carboxyl groups.

This equation corresponds to an equation $R = c/(b+c)$ in a different expression, wherein b and c refers to the molar ratios in the chemical structure (X) and (Y) of the film, respectively.

In the infrared light absorption spectra of the film according to the present invention, the absorption spectrum, wherein the absorption of C=O stretching vibration of carboxylic acids and the absorption of C=O stretching vibration of carbonyl carbon of ester bonds originating in poly(meth)acrylic acid (A) are overlapping too, and the absorption spectrum of anions of poly(meth)acrylic acid are slightly overlapped with each other. Accordingly, the same evaluation of the degree of esterification as described previously is possible by previously immersing the film in dilute aqueous solution of hydrochloric acid or sulfuric acid to extract metal ions in the ionic cross-linking structure, thereby converting all the carboxylic acid anions of poly (meth)acrylic acid into free carboxylic acids. In that case, the molar ratios R means directly the degree of esterification.

Since molar ratio of the sum of carbon-oxygen double bonds of free carboxylic acids and ester bonds against all the carbon-oxygen double bonds originating in poly(meth) acrylic acid contained in the film can be determined by evaluating the degree of ionization of the film according to the present invention, the molar ratio of the carbon-oxygen double bonds of ester bonds against all the carbon-oxygen double bonds in the film expressed by the foregoing equation (1) is calculated by the following equation (3):

(Degree of esterification)={1−(degree of ionization)}.
$R=c/(b+c+d)$ (3)

wherein b, c and d denote molar ratios of carbon-oxygen double bonds in the chemical structures (X), (Y) and (Z) in the resin composition, respectively.

The cross-linked structure in the film according to the present invention comprises ester bonds (ester cross-linking) between poly(meth)acrylic acid (A) and hydroxy groups in the polyalcoholic polymer (B), wherein carboxyl groups of poly(meth)acrylic acid (A) in the cross-linked structure forms an ionic cross-linking with the metal (C). The film is composed of a cross-linked structure having a peculiar gas barrier property, wherein the ratio between the degree of ester cross-linking and the degree of ionic cross-linking falls within a given range. It is desirable that the film comprising the resin composition according to the present invention has a preferable oxygen permeation coefficient of $3.40 \times 10^{-13}$ $cm^3$ (STP).cm/$m^2$.s.Pa ($1.52 \times 10^{-19}$ mol/m.s.Pa) or less, more preferably $1.70 \times 10^{-13}$ $cm^3$ (STP).cm/$m^2$.s.Pa ($7.6 \times 10^{-20}$ mol/m.s.Pa) or less, measured at a temperature of 30° C. and relative humidity (RH) of 80%. It is also desirable that the laminated film containing at least one layer of the above film has an oxygen permeation coefficient as described above.

In the measurement of the oxygen permeability in the present invention, the oxygen permeation coefficient is calculated by multiplying the measured value of oxygen permeability obtained by the method according to ASTM D3985-81 by the thickness of the film. SI unit according to ASTM D3985-81 is used as the unit of the oxygen permeation coefficient, a conventional unit being also described in the parenthesis. When the sample is composed of a laminate film, the oxygen permeation coefficient for each film unit is calculated using the following equation:

$1/P_{total}=1/P_1+1/P_2+\ldots 1/P_i$ wherein $P_{total}$ is oxygen permeability of laminated film, and $P_1$, $P_2$, $P_i$ are oxygen permeability of i-th layer (quoted from J. Comyn "Polymer Permeability", Elsevier Applied Science Publishers (1986)).

The oxygen permeation coefficient of a gas barrier film unit is calculated by measuring the oxygen permeability of a laminated film and each oxygen permeability of each film used in the laminated film.

The production process of the gas barrier film comprising the resin composition according to the 6th embodiment of the present invention comprises the steps of (1) forming a film-like article of a composition mainly composed of poly(meth)acrylic acid (A) and polyalcoholic polymer (B), (2) heat-treating the film-like article, and (3) treating the film-like article after the heat treatment in a medium containing a metal (C).

Since the film obtained by the present invention has hot-water resistance, chemical resistance, mechanical strength, moisture resistance and gas barrier property, it can be used for a variety of uses where these properties are required. For example, the film is advantageously used for packaging of edible oils being susceptible to oxidative degradation as well as foodstuffs containing a lot of oil, foodstuffs for the purpose of a long term storage, foodstuffs to be subjected to hot water (boiling) sterilization or retort sterilization and foodstuffs required to keep aroma. The film can be also advantageously used in packaging non-foodstuffs that are required to avoid a contact with oxygen, or packaging of detergents and perfumes that are required to keep good smell. Examples of foodstuffs that should be subjected to hot-water sterilization and retort sterilization include seasonings such as curry, stew and macaroni sauce, mixed seasonings such as Chinese food base, baby food, cooked foods for oven toaster and electronic oven processing, soup, dessert and processed foodstuffs of agriculture, livestock and marine products, especially in packaging of foodstuffs such as potato and corn that is also heat-treated for the purpose of sterilization.

While the present invention will be described in more detail referring to the following examples, it is by no means limited to the examples set forth hereinafter.

1. [Measurement of degree of ionization (degree of ionic cross-linking)]

The degree of ionization was calculated from the peak area ratio obtained by measuring infrared light absorption spectra of the film as described previously. The infrared light absorption spectra were measured using FT-IR1710 made by Perkin-Elmer Co.

2. [Measurement of degree of esterification (degree of ester cross-linking)]

After measuring the infrared light absorption spectra of the end use product film and poly(meth)acrylic acid, C=O stretching vibration originating in ester bonds in the end use product film was isolated by the difference of the absorption spectra between carbon-oxygen double bonds of both films. Then, the sum of the carbon-oxygen double bonds of free carboxylic acid and ester bonds were determined from the ratio of the absorption peak area of the end product film to calculate the molar ratio R between them, followed by calculating the degree of esterification by the equation (3) using the degree of ionization previously determined by the method described in 1. The infrared light absorption spectra were measured using FT-IR 1710 made by Perkin-Elmer Co.

3. [Measurement of oxygen permeability and oxygen permeation coefficient]

The oxygen permeation coefficient of the laminated film was obtained by measuring the oxygen permeability with a oxygen permeation test instrument OXTRAN™ 2/20 made by Modern Control Co. at a temperature of 30° C. and relative humidity of 80%. The oxygen permeation coefficient was calculated from the measured oxygen permeability.

4. [Hot-water resistance of the film]

The films obtained in Examples and Comparative examples were placed in a steam atmosphere using an autoclave for evaluating the hot-water resistance of the films at a temperature of 130° C. and a pressure of 1.5 kg/cm² for 20 minutes. The oxygen permeability was measured after the ionic cross-linking treatment.

[Preparation of aqueous solution of polyvinyl alcohol (aqueous solution B1)]

An aqueous solution of 10% by mass of polyvinyl alcohol (aqueous solution B1) was prepared using Poval™ 105 (degree of saponification 98.5%, mean degree of polymerization 500, made by Kuraray Co.) as polyvinyl alcohol (PVA) by dissolving PVA with heating after adding 90 parts by mass of water to 10 parts by mass of PVA.

[Preparation of aqueous solution of starch (aqueous solution B2)]

An aqueous solution of 10% by weight of starch (aqueous solution B2) was prepared using a starch powder (water soluble, made by Wako Junyaku Co.) by dissolving the starch with heating after adding 90 parts by mass of water to 10 parts by mass of starch.

[Preparation of aqueous solution of partially neutralized poly(meth)acrylic acid (aqueous solution A)]

An aqueous solution of 10% by mass of poly(meth)acrylic acid (PAA) was prepared using Aron A10-H (made by Toa Synthetic Chemicals Co., 25% by mass of aqueous solution, number average molecular weight 150,000) as PAA by diluting the PAA solution 2/5 times with distilled water. An aqueous solution of partially neutralized PAA with a degree of neutralization of 10% (aqueous solution A) was prepared by adding 0.56 parts by mass of sodium hydroxide to 100 parts by mass of 10% by mass PAA aqueous solution. The concentration of the partially neutralized PAA aqueous solution with a degree of neutralization of 10% was about 10% by mass.

The degree of neutralization of PAA can be calculated by the equation: Degree of neutralization=$(N/N_0) \times 100(\%)$, wherein N is mole number of partially neutralized carboxylic acid in 1 g of PAA and $N_0$ is mole number of carboxylic acid in 1 g of PAA before neutralization.

Metal ions in city water used in the examples were quantitatively assayed by atomic absorption methods, showing the concentrations of 2 ppm, 3 ppm, 2.3 ppm and 10 ppm for Na, K, Mg and Ca, respectively.

EXAMPLES 1 TO 3

An aqueous solution obtained by mixing the aqueous solutions B1 and A was coated on an oriented polyethylene-terephthalate film (PET film; Lumillar™ S10, thickness 12 μm, made by Torey Co.) using a reverse roll coater and dried, forming a coating film with a mixing mass ratio as shown in Table 1 of PVA and PAA, having a degree of neutralization of 10%, on the PET film.

The thickness of the coating film was 1 μm. A heat treatment was then applied to the PET film on which the foregoing coating film was formed by making the film to contact with a hot-roll adjusted to 230° C. for 37 seconds. A non-oriented polypropylene film (CPP film, thickness 50 μm) was laminated in a dry condition via an adhesive layer (Adcoat™ AD335A made by Toyo Morton Co., curing agent; CAT 10) on the PET film side of the heat-treated film. The CPP film faces of two sheets of the laminated film were overlapped with each other to seal three side lines using Impulse sealer made by Fuji Impulse Co., thereby preparing a packaging bag with an inner dimension of 25 cm×20 cm while remaining the coating film to be exposed outside of the bag.

100 ml of distilled water was placed into the bag through the opened port of the bag and the port was sealed with Impulse sealer to prepare a packaged article. The inner diameter surrounded by four seal lines was 20 cm×20 cm.

The packaged article in which distilled water was sealed was immersed in about 3 liters of city water and was subjected to a retort treatment under conditions of 130° C. and 1.5 kg/cm² for 20 minutes using an autoclave SD-30ND made by Tomy Seiko Co. After the treatment, the packaged article was open and pieces of the laminated film of the packaged article were cut off in an appropriate size to measure the oxygen permeability of the laminated film and to calculate the oxygen permeation coefficient from the measured oxygen permeability and the thickness of the film, obtaining the results shown in Table 1.

EXAMPLES 4 TO 10

An aqueous solution obtained by mixing the aqueous solutions B2 and A was coated on an oriented polyethylene-terephthalate film (PET film; Lumillar™ S10, thickness 12 μm, made by Toray Co.) using a reverse roll coater and dried, forming a coating film with a mixing mass ratio as shown in Table 1 of starch and PAA, having a degree of neutralization of 10%, on the PET film. The thickness of the coating film was 1 μm. A heat treatment was then applied to the PET film on which the foregoing coating film was formed by making the film to contact with a hot-roll adjusted to 230° C. for 37 seconds.

A non-oriented polypropylene film (CPP film, thickness 50 μm) was laminated in dry condition via an adhesive layer (Adcoat™ AD335A made by Toyo Morton Co., curing agent: CAT 10) on the PET film side of the heat-treated film. The CPP film faces of two sheets of the laminated film were overlapped with each other to seal three side lines using Impulse sealer made by Fuji Impulse Co., thereby preparing a packaging bag with an inner dimension of 25 cm×20 cm while the coating film remains exposed on the outside of the bag.

100 ml of distilled water was placed into the bag through the opened port of the bag and the port was sealed with Impulse sealer to prepare a packaged article. The inner diameter surrounded by four seal lines was 20 cm×20 cm.

The packaged article in which distilled water was sealed was immersed in about 3 liters of city water and was subjected to a retort treatment under a conditions of 130° C. and 1.5 kg/cm² for 20 minutes using an autoclave SD-30ND made by Tomy Seiko Co.

Immersion solvents for retort treatments were city water in Examples 4 to 6, 0.2% by mass of aqueous solution of calcium hydroxide in Example 7, 0.2% by mass of aqueous solution of magnesium hydroxide in Example 8, 0.2% by mass of aqueous solution of magnesium carbonate in Example 9 and 0.2% by mass of aqueous solution of magnesium oxide in Example 10. After the treatment, the packaged article was open and pieces of the laminated film of the packaged article were cut off in an appropriate size to measure the oxygen permeability of the laminated film. The results are shown in Table 1.

COMPARATIVE EXAMPLES 1 AND 2

An aqueous solution obtained by mixing 70 parts by mass of the aqueous solution A to 30 parts by mass of the aqueous solution B2 was coated on an oriented polyethylene-terephthalate film (PET film; Lumillar™ S10, thickness 12 μm, made by Torey Co.) using a reverse roll coater and dried, forming a coating film with a mass ratio of starch and PAA, having a degree of neutralization of 10%, of 30:70 on the PET film. The thickness of the coating film was 1 μm. A heat treatment was then applied to the PET film on which the foregoing coating film was formed by making the film to contact with a hot-roll adjusted to 230° C. for 37 seconds.

A non-oriented polypropylene film (CPP film, thickness 50 μm) was laminated in dry condition via an adhesive layer (Adcoat™ AD335A made by Toyo Morton Co., curing agent: CAT 10) on the coating film side of the heat-treated film to form a laminated film having the following layer structure:

PET film/coating film/adhesive/CPP film.

The CPP film faces of two sheets of the laminated film were overlapped with each other to seal three side lines using Impulse sealer made by Fuji Impulse Co., thereby preparing a packaging bag with an inner dimension of 25 cm×20 cm while the coating film, which is interposed between the PET film layer and the CPP film layer, is not exposed on the outside of the bag.

100 ml of distilled water was placed into the bag through the opened port of the bag and the port was sealed with Impulse sealer to prepare a packaged article. The inner diameter surrounded by four seal lines was 20 cm×20 cm.

The packaged article in which distilled water was sealed was immersed in about 3 liters of city water and was subjected to a retort treatment under conditions of 130° C. and 1.5 kg/cm² for 20 minutes using an autoclave SD-30ND made by Tomy Seiko Co (Comparative example 1). The packaged article in example 4 was subjected to a retort treatment in distilled water by the same condition (Comparative example 2). After the treatment, the packaged article was open and pieces of the laminated film of the packaged article were cut off in an appropriate size to measure the oxygen permeability of the laminated film. The results are shown in Table 1.

EXAMPLE 11

An aqueous solution obtained by mixing 70 parts by mass of aqueous solution A to 30 parts by mass of aqueous solution B1 was coated on an oriented polyethylene-terephthalate film (PET film, made by Torey CO., Lumillar™ S10, thickness 12 μm) using a reverse roll coater and dried, forming a film (thickness 1 μm) of the mixture comprising PVA:PAA with a degree of neutralization of 10% =30:70 (mass ratio) on the PET film. The PET film on which the foregoing film is formed was heat-treated in an oven adjusted to 200° C. for 15 minutes. The heat-treated film obtained was immersed in city water and subjected to an ionic cross linking treatment using SD-30ND (an autoclave made by Tomy Seiko Co.) under a condition of 130° C. and 1.5 kg/cm² for 20 minutes. The degree of ionization, the degree of esterification and oxygen permeability of the film after the treatment were measured. The results are shown in Table 2.

EXAMPLE 12

The heat-treated film obtained in Example 11 was immersed in an aqueous solution of magnesium hydroxide with a concentration of 1 g/liter to subject the film to the ionic cross-linking treatment by the same condition as in example 11. The degree of ionization, the degree of esterification and oxygen permeability of the film after the treatment were measured. The results are shown in Table 2.

EXAMPLE 13

The heat-treated film obtained in Example 11 was immersed in city water to subject the film to an immersion treatment at 90° C. for 1 hour. The degree of ionization, the degree of esterification and oxygen permeability of the film after the treatment were measured. The results are shown in Table 2.

TABLE 1

|  | (Outermost layer) composition & mass ratio | Immersion solvent for retort treatment | Oxygen permeation after retort treatment *1 | Oxygen permeation before retort treatment *1 | Degree of ES cross-linking before retort treatment *2 |
| --- | --- | --- | --- | --- | --- |
| Example 1 | PVA/PAA = 30/70 | City water | 1.53 (0.3) | 23.5 (4.6) | 18 |
| Example 2 | PVA/PAA = 20/80 | City water | 0.36 (0.07) | 34.7 (6.8) | 15 |
| Example 3 | PVA/PAA = 5/95 | City water | 0.62 (0.12) | 612 (120) | 6 |
| Example 4 | Starch/PAA = 30/70 | City water | 0.26 (0.05) | 9.2 (1.8) | 20 |
| Example 5 | Starch/PAA = 10/90 | City water | 0.51 (0.1) | 561 (110) | 18 |
| Example 6 | Starch/PAA = 20/80 | City water | 0.26 (0.05) | 56.1 (11) | 12 |
| Example 7 | Starch/PAA = 30/70 | Ca(OH)$_2$/Dist. Water | 0.26 (0.05) | 9.2 (1.8) | 20 |
| Example 8 | Starch/PAA = 30/70 | Mg(OH)$_2$/Dist. Water | 0.26 (0.05) | 9.2 (1.8) | 20 |
| Example 9 | Starch/PAA = 30/70 | MgCO$_3$/Dist. Water | 0.26 (0.05) | 9.2 (1.8) | 20 |
| Example 10 | Starch/PAA = 30/70 | MgO/Dist. Water | 0.26 (0.05) | 9.2 (1.8) | 20 |
| Comparative example 1 | Starch/PAA = 30/70 (intermediate layer) | City water | 104 (20) | 9.2 (1.8) | 20 |
| Comparative example 2 | Starch/PAA = 30/70 (outermost layer) | Dist. Water | 82 (16) | 9.2 (1.8) | 20 |

*1 Unit: the upper side is oxygen permeation coefficient (×10$^{-21}$ · mol/m · s · Pa) The lower side in parenthesis is degree of oxygen permeation (cm³/m² · day · atm) (measured at 30° C., 80% RH)
*2 degree of ES cross-linking: degree of ester cross-linking (%)

EXAMPLE 14

The heat-treated film obtained in Example 11 was immersed in an aqueous solution of magnesium hydroxide with a concentration of 1 g/liter at 90° C. for 1 hour. The degree of ionization, the degree of esterification and oxygen permeability of the film after the treatment were measured. The results are shown in Table 2.

EXAMPLE 15

An aqueous solution obtained by mixing 70 parts by mass of aqueous solution A to 30 parts by mass of aqueous solution B2 was coated on an oriented polyethylene-terephthalate film (PET film, made by Torey CO., Lumillar™ S10, thickness 12 μm) using a reverse roll coater and dried, forming a film (thickness 1 μm) of the mixture comprising starch:PAA with a degree of neutralization of 10% =30:70 (mass ratio) on the PET film. The PET film on which the foregoing film is formed was heat-treated in an oven adjusted to 200° C. for 15 minutes. The heat-treated film obtained was immersed in city water and subjected to an ionic cross linking treatment using an autoclave SD-30ND under a condition of 130° C. and 1.5 kg/cm² for 20 minutes. The degree of ionization, the degree of esterification and oxygen permeability of the film after the treatment were measured. The results are shown in Table 2.

EXAMPLE 16

The heat-treated film obtained in Example 15 was immersed in an aqueous solution of magnesium hydroxide with a concentration of 1 g/liter to subject the film to an ionic cross-linking treatment by the same condition as in Example 15. The degree of ionization, the degree of esterification and oxygen permeability of the film after the treatment were measured. The results are shown in Table 2.

EXAMPLE 17

The heat-treated film obtained in Example 15 was immersed in city water to subject the film to an immersion treatment at 90° C. for 1 hour. The degree of ionization, the degree of esterification and oxygen permeability of the film after the treatment were measured. The results are shown in Table 2.

EXAMPLE 18

The heat-treated film obtained in Example 15 was immersed in an aqueous solution of magnesium hydroxide with a concentration of 1 g/liter to subject the film to an ionic cross-linking treatment by the same condition as in Example 15. The degree of ionization, the degree of esterification and oxygen permeability of the film after the treatment were measured. The results are shown in Table 2.

EXAMPLE 19

The heat-treated film obtained in Example 15 was immersed in an aqueous solution of magnesium carbonate with a concentration of 1 g/liter to subject the film to an ionic cross-linking treatment by the same condition as in Example 15. The degree of ionization, the degree of esterification and oxygen permeability of the film after the treatment were measured. The results are shown in Table 2.

EXAMPLE 20

The heat-treated film obtained in Example 15 was immersed in an aqueous solution of calcium hydroxide with a concentration of 1 g/liter to subject the film to an ionic cross-linking treatment by the same condition as in Example 15. The degree of ionization, the degree of esterification and oxygen permeability of the film after the treatment were measured. The results are shown in Table 2.

EXAMPLE 21

The heat-treated film obtained in Example 15 was immersed in an aqueous solution of calcium carbonate with a concentration of 1 g/liter to subject the film to an ionic cross-linking treatment by the same condition as in Example 15. The degree of ionization, the degree of esterification and oxygen permeability of the film after the treatment were measured. The results are shown in Table 2.

EXAMPLE 22

An aqueous solution obtained by mixing 70 parts by mass of (aqueous solution A) to 30 parts by mass of (aqueous solution B2) was coated on an oriented polyethylene-terephthalate film (PET film, made by Torey CO., Lumillar™ S10, thickness 12 μm) using a reverse roll coater and dried, forming a film (thickness 1 μm) of the mixture comprising starch:PAA with a degree of neutralization of 10%=30 70 (mass ratio) on the oriented polyethyleneterephthalate film. The PET film on which the foregoing film is formed was heat-treated in an oven adjusted to 230° C. for 37 seconds. The heat-treated film obtained was immersed in an aqueous solution of magnesium hydroxide with a concentration of 1 g/liter and subjected to an ionic cross linking treatment using an autoclave SD-30ND under a condition of 130° C. and 1.5 kg/cm² for 20 minutes. The degree of ionization, the degree of esterification and oxygen permeability of the film after the treatment were measured. The results are shown in Table 2.

TABLE 2

| Example | Composition of material (*1) (mass %) | Heat Treatment Condition (*2) | Ionic cross-linking treatment condition | Degree of ionization | Degree of esterification | Oxygen permeation coefficient (*3) | (*4) |
|---|---|---|---|---|---|---|---|
| 11 | B1/A = 30/70 | A | City water, 130° C., 20 min | 0.5 | 0.1 | 1.52 (3.40) | 1.52 (3.40) |
| 12 | B1/A = 30/70 | A | aq. Mg(OH)₂, 130° C., 20 min | 0.5 | 0.1 | 1.52 (3.40) | 1.52 (3.40) |
| 13 | B1/A = 30/70 | A | City water, 90° C., 1 hr | 0.5 | 0.1 | 1.52 (3.40) | 1.52 (3.40) |

TABLE 2-continued

| Example | Composition of material (*1) (mass %) | Heat Treatment Condition (*2) | Ionic cross-linking treatment condition | Degree of ionization | Degree of esterification | Oxygen permeation coefficient (*3) | (*4) |
|---|---|---|---|---|---|---|---|
| 14 | B1/A = 30/70 | A | aq. Mg(OH)$_2$, 90° C., 1 hr | 0.5 | 0.1 | 1.52 (3.40) | 1.52 (3.40) |
| 15 | B2/A = 30/70 | A | City water, 130° C., 20 min | 0.5 | 0.1 | 0.51 (1.10) | 0.51 (1.10) |
| 16 | B2/A = 30/70 | A | aq. Mg(OH)$_2$, 130° C., 20 min | 0.5 | 0.1 | 0.51 (1.10) | 0.51 (1.10) |
| 17 | B2/A = 30/70 | A | City water, 90° C., 1 hr | 0.5 | 0.1 | 0.51 (1.10) | 0.51 (1.10) |
| 18 | B2/A = 30/70 | A | aq. Mg(OH)$_2$, 90° C., 1 hr | 0.5 | 0.1 | 0.51 (1.10) | 0.51 (1.10) |
| 19 | B2/A = 30/70 | A | aq. MgCO$_3$, 130° C., 20 min | 0.5 | 0.1 | 0.51 (1.10) | 0.51 (1.10) |
| 20 | B2/A = 30/70 | A | aq. Ca(OH)$_2$, 130° C., 20 min | 0.5 | 0.1 | 0.51 (1.10) | 0.51 (1.10) |
| 21 | B2/A = 30/70 | A | aq. CaCO$_3$, 130° C., 20 min | 0.5 | 0.1 | 0.51 (1.10) | 0.51 (1.10) |
| 22 | B2/A = 30/70 | 230° C., 37 sec | aq. Mg(OH)$_2$, 130° C., 20 min | 0.5 | 0.1 | 0.51 (1.10) | 0.51 (1.10) |

(*1) B1: aq. 10% by mass solution of PVA, B2: aq. 10% by mass solution of starch A: aq. 10% by mass solution of partially neutralized PAA with a degree of neutralization of 10%
(*2) A corresponds to a heat treatment at 200° C. for 15 min.
(*3) Before hot-water resistance test, the unit is; upper side (×10$^{-21}$ mol/m · s · Pa) lower side in parenthesis (×10$^{-15}$ cm$^3$ (STP) · cm/m$^2$ · s · Pa)
(*4) After hot-water resistance test (130° C., 1.5 kg/cm$^2$, 20 min.) The unit is; upper side (×10$^{-21}$ mol/m · s · Pa), lower side in parenthesis (×10$^{-15}$ cm$^3$(STP) · cm/m$^2$ · s · Pa)

EXAMPLE 23

Aqueous solutions of mixtures with a mass ratios of PVA and PAA, having a degree of neutralization of 10%, of 20:80, 10:90 and 5:95, respectively, were prepared by mixing the aqueous solution B1 and aqueous solution A. Films (a thickness of 1 μm) comprising the mixtures with mass ratios of PVA and PAA, having a degree of neutralization of 10%, of 20:80, 10:90 and 5:95 were formed on the oriented PET films (Made by Torey Co., Lumillar™ S10, a thickness of 12 μm). The PET films on which the foregoing films were formed were heat-treated in an oven adjusted to a temperature of 200° C. for 15 minutes. The heat treated films obtained were immersed in an aqueous solution of magnesium hydroxide with a concentration of 1 g/liter, followed by subjecting to an ionic cross-linking treatment under a condition of a temperature of 130° C. and a pressure of 1.5 kg/cm$^2$ for 20 minutes using an autoclave SD-30ND. After the treatment, the degree of ionization, the degree of esterification and oxygen permeability were measured. The results are shown in Table 3.

EXAMPLE 24

Aqueous solutions of mixtures with a mass ratios of starch and PAA, having a degree of neutralization of 10%, of 50:50, 40:60, 20:80, 10:90, 7:93 and 5:95, respectively, were prepared by mixing the aqueous solution B2 and aqueous solution A. Films (a thickness of 1 μm) comprising the mixtures with mass ratios of starch and PAA, having a degree of neutralization of 10%, of 50:50, 40:60, 20:80, 10:90, 7:93 and 5:95 were formed on oriented PET films (made by Torey Co., Lumillar™ S10, a thickness of 12 μm). The PET films on which the foregoing films were formed were heat-treated in an oven adjusted to a temperature of 200° C. for 15 minutes. The heat treated films obtained were immersed in an aqueous solution of magnesium hydroxide with a concentration of 1 g/liter, followed by subjecting to an ionic cross-linking treatment under a condition of a temperature of 130° C. and a pressure of 1.5 kg/cm$^2$ for 20 minutes using an autoclave SD-30ND. After the treatment, the degree of ionization, the degree of esterification and oxygen permeability were measured. The results are shown in Table 3.

TABLE 3

| Example | Composition of material (*1) (mass %) | Heat Treatment Condition (*2) | Ionic cross-linking treatment condition | Degree of ionization | Degree of esterification | Oxygen permeation coefficient (*3) | (*4) |
|---|---|---|---|---|---|---|---|
| 23 | B1/A = 20/80 | A | aq. Mg(OH)$_2$, 130° C., 20 min | 0.55 | 0.08 | 0.51 (1.10) | 0.51 (1.10) |
|  | B1/A = 10/90 | A | aq. Mg(OH)$_2$, 130° C., 20 min | 0.60 | 0.06 | 0.51 (1.10) | 0.51 (1.10) |
|  | B1/A = 5/95 | A | aq. Mg(OH)$_2$, 130° C., 20 min | 0.65 | 0.05 | 0.51 (1.10) | 0.51 (1.10) |

TABLE 3-continued

| Example | Composition of material (*1) (mass %) | Heat Treatment Condition (*2) | Ionic cross-linking treatment condition | Degree of ionization | Degree of esterification | Oxygen permeation coefficient (*3) | (*4) |
|---|---|---|---|---|---|---|---|
| 24 | B2/A = 50/50 | A | aq. Mg(OH)$_2$, 130° C., 20 min | 0.4 | 0.15 | 4.46 (10.0) | 4.46 (10.0) |
| | B2/A = 40/60 | A | aq. Mg(OH)$_2$, 130° C., 20 min | 0.5 | 0.12 | 15.2 (34.0) | 15.2 (34.0) |
| | B2/A = 20/80 | A | aq. Mg(OH)$_2$, 130° C., 20 min | 0.55 | 0.08 | 0.51 (1.10) | 0.51 (1.10) |
| | B2/A = 10/90 | A | aq. Mg(OH)$_2$, 130° C., 20 min | 0.60 | 0.06 | 0.51 (1.10) | 0.51 (1.10) |
| | B2/A = 7/93 | A | aq. Mg(OH)$_2$, 130° C., 20 min | 0.65 | 0.05 | 9.05 (20.3) | 9.05 (20.3) |
| | B2/A = 5/95 | A | aq. Mg(OH)$_2$, 130° C., 20 min | 0.65 | 0.05 | 26.9 (60.3) | 26.9 (60.3) |

(*1) B1: aq. 10% by mass solution of PVA, B2: aq. 10% by mass solution of starch A: aq. 10% by mass solution of partially neutralized PAA with a degree of neutralization of 10%
(*2) A corresponds to a heat treatment at 200° C. for 15 min.
(*3) Before hot-water resistance test, the unit is; upper side ($\times 10^{-21}$ mol/m · s · Pa), lower side in parenthesis ($\times 10^{-15}$ cm$^3$ (STP) · cm/m$^2$ · s · Pa)
(*4) After hot-water resistance test (130° C., 1.5 kg/cm$^2$, 20 min.) The unit is; upper side ($\times 10^{-21}$ mol/m · s · Pa), lower side in parenthesis ($\times 10^{-15}$ cm$^3$(STP) · cm/m$^2$ · s · Pa)

EXAMPLE 25

A 10% by mass of PAA solution was prepared using Aron™ A-10H (made by Toa Synthetic Chemicals Co., 25% aqueous solution, number average molecular weight 150,000) and diluting by 2/5 times with distilled water. An aqueous solution of partially neutralized PAA with a degree of neutralization of 2, 5, 8, 12, 15 or 20% was prepared by adding a calculated amount of sodium hydroxide to each of 100 parts by mass of 10% by mass PAA solution (Abbreviated as A2, A5, A8, A12, A15 and A20, respectively, in Table 4). The concentration of each of the partially neutralized aqueous PAA solution is about 10% by mass. The aqueous solutions obtained by mixing 70 parts by mass of PAA or partially neutralized PAA with 30 parts by mass of aqueous solution B2 (the former solution is abbreviated as A0 in Table 4) were coated on an oriented PET film (made by Torey Co., Lumillar™ S10, a thickness of 12 μm) using a reverse coater and the coated films were dried, obtaining coating films (a thickness of 1 μm) of the mixture with compositions of (starch:PAA or partially neutralized PAA=30:70 (% by mass)) on the PET films.

The PET films on which the coating films were formed were heat-treated in an oven adjusted to a temperature of 200° C. for 15 minutes. The heat-treated films obtained were immersed in an aqueous solution of magnesium hydroxide with a concentration of 1 g/liter and were subjected to a ionic cross-linking treatment using an autoclave SD-30ND under a condition of a temperature of 130° C. and a pressure of 1.5 kg/cm$^2$ for 20 minutes. The degree of ionization, the degree of esterification and oxygen permeability of the films after the treatment were measured. The results are listed in Table 4.

COMPARATIVE EXAMPLE 3

Aron™ A-10H (25% aqueous solution, number average molecular weight 150,000) made by Toa Synthetic Chemicals Co. was used as PAA and an aqueous PAA solution with a concentration of 10% by mass was prepared by diluting the original PAA solution 2/5 times with distilled water. An aqueous solution obtained by mixing 70 parts by mass of 10% by mass PAA aqueous solution with 30 parts by mass of aqueous solution B1 was coated on an oriented PET film (made by Torey Co., Lumillar™ S10, a thickness of 12 μm) using a reverse coater and the coated films were dried, obtaining a coating film (a thickness of 1 μm) of the mixture with compositions of (PVA:PAA=30:70 (% by weight)) on the PET films. The PET film on which the coated film was formed was heat treated in an oven adjusted to 200° C. for 15 minutes. The degree of ionization, the degree of esterification and oxygen permeability of the films after the treatment were measured. The results are listed in Table 4.

COMPARATIVE EXAMPLE 4

Aron™ A-10H (25% aqueous solution, number average molecular weight 150,000) made by Toa Synthetic Chemicals Co. was used as PAA and an aqueous PAA solution with a concentration of 10% by mass was prepared by diluting the original PAA solution 2/5 times with distilled water. An aqueous solution obtained by mixing 70 parts by mass of 10% by mass PAA aqueous solution with 30 parts by mass of aqueous solution B2 was coated on an oriented PET film (made by Torey Co., Lumillar™ S10, a thickness of 12 μm) using a reverse coater and the coated films were dried, obtaining a coating film (a thickness of 1 μm) of the mixture with compositions of (starch:PAA=30:70 (% by mass)) on the PET films. The PET film on which the coated film was formed was heat treated in an oven adjusted to 200° C. for 15 minutes. The degree of ionization, the degree of esterification and oxygen permeability of the films after the treatment were measured. The results are listed in Table 4.

TABLE 4

| Example | Composition of material (*1) (mass %) | Heat Treatment Condition (*2) | Ionic cross-linking treatment condition | Degree of ionization | Degree of esterification | Oxygen permeation coefficient (*3) | (*4) |
|---|---|---|---|---|---|---|---|
| 25 | B2/A0 = 30/70 | A | aq. Mg(OH)$_2$, 130° C., 20 min. | 0.5 | 0.08 | 15.2 (34.0) | 15.2 (34.0) |
|  | B2/A2 = 30/70 | A | aq. Mg(OH)$_2$, 130° C., 20 min. | 0.5 | 0.1 | 2.50 (5.60) | 2.50 (5.60) |
|  | B2/A5 = 30/70 | A | aq. Mg(OH)$_2$, 130° C., 20 min. | 0.5 | 0.1 | 1.02 (2.20) | 1.02 (2.20) |
|  | B2/A8 = 30/70 | A | aq. Mg(oH)$_2$, 130° C., 20 min. | 0.5 | 0.1 | 0.51 (1.10) | 0.51 (1.10) |
|  | B2/A12 = 30/70 | A | aq. Mg(OH)$_2$, 130° C., 20 min. | 0.5 | 0.08 | 1.35 (3.03) | 1.35 (3.03) |
|  | B2/A15 = 30/70 | A | aq. Mg(OH)$_2$, 130° C., 20 min. | 0.5 | 0.05 | 18.7 (42.0) | 18.7 (42.0) |
|  | B2/A20 = 30/70 | A | aq. Mg(OH)$_2$, 130° C., 20 min. | 0.5 | 0.05 | 40.1 (90.0) | 40.1 (90.0) |
| Comparative example |  |  |  |  |  |  |  |
| 3 | B1/PAA = 30/70 | A | No Treatment | 0 | 0.02 | 490 (1100) | 2230 (5000) |
| 4 | B2/PAA = 30/70 | A | No Treatment | 0 | 0.02 | 312 (700) | 1560 (3500) |

(*1) B1: aq. 10% by mass solution of PVA, B2: aq. 10% by mass solution of starch A: aq. 10% by mass solution of partially neutralized PAA with a degree of neutralization of 10%
(*2) A corresponds to a heat treatment at 200° C. for 15 min.
(*3) Before hot-water resistance test, the unit is; upper side (×10$^{-21}$ mol/m · s · Pa) lower side in parenthesis (×10$^{-15}$cm$^3$ (STP) · cm/m$^2$ · s · Pa)
(*4) After hot-water resistance test (130° C., 1.5 kg/cm$^2$, 20 min.) The unit is; upper side (×10$^{-21}$ mol/m · s · Pa), lower side in parenthesis (×10$^{-15}$ cm$^3$(STP) · cm/m$^2$ · s · Pa)

EXAMPLES 26 TO 31

Anhydrous copper acetate (Cu(Ac)$_2$) (Example 26) cobalt hydroxide (Co(OH)$_2$) (Example 27), nickel acetate tetrahydrate (Ni(Ac)$_2$4H$_2$O) (Example 28), magnesium acetate tetrahydrate (Mg(Ac)$_2$4H$_2$O) (Example 29), manganese acetate tetrahydrate (Mn(Ac)$_2$4H$_2$O) (Example 30) and zinc oxide (ZnO) (Example 31) were used instead of magnesium hydroxide in Example 16 and the films obtained were heat-treated by the same condition as in Example 16. The concentrations of each metal compounds were the same as in Example 16 with respect to cobalt hydroxide and zinc oxide but were 10 g/liter for other compounds. The degree of ionization, the degree of esterification and oxygen permeability of the films after the treatment were measured. The results are listed in Table 5.

TABLE 5

| Example | Composition of material (*1) (mass %) | Heat Treatment Condition (*2) | Ionic cross-linking treatment condition | Degree of ionization | Degree of esterification | Oxygen permeation coefficient (*3) | (*4) |
|---|---|---|---|---|---|---|---|
| 26 | B2/A = 30/70 | A | aq. Cu(Ac)$_2$, 1301, 20 min | 0.3 | 0.1 | 18.7 (42.0) | 18.7 (42.0) |
| 27 | B2/A = 30/70 | A | aq. Co(OH), 130° C., 20 min | 0.36 | 0.1 | 1.96 (4.40) | 1.96 (4.40) |
| 28 | B2/A = 30/70 | A | aq. Ni(Ac)$_2$4H$_2$O, 130° C., 20 min | 0.21 | 0.1 | 10.7 (24.0) | 10.7 (24.0) |
| 29 | B2/A = 30/70 | A | aq. Mg(Ac)$_2$, 130° C., 20 min | 0.5 | 0.1 | 0.51 (1.10) | 0.51 (1.10) |
| 30 | B2/A = 30/70 | A | aq. Mg(Ac)$_2$, 130° C., 20 min | 0.5 | 0.1 | 1.50 (3.30) | 1.50 (3.30) |
| 31 | B2/A = 30/70 | A | aq. Zn, 130° C., 20 min | 0.4 | 0.1 | 1.02 (2.20) | 1.02 (2.20) |

(*1) B1: aq. 10% by mass solution of PVA, B2: aq. 10% by mass solution of starch A: aq. 10% by mass solution of partially neutralized PAA with a degree of neutralization of 10%
(*2) A corresponds to a heat treatment at 200° C. for 15 min.
(*3) Before hot-water resistance test, the unit is; upper side (×10$^{-21}$ mol/m · s · Pa) lower side in parenthesis (×10$^{-15}$cm$^3$ (STP) · cm/m$^2$ · s · Pa)
(*4) After hot-water resistance test (130° C., 1.5 kg/cm$^2$, 20 min.) The unit is; upper side (×10$^{-21}$ mol/m · s · Pa), lower side in parenthesis (×10$^{-15}$ cm$^3$(STP) · cm/m$^2$ · s · Pa)

EXAMPLES 32 TO 34, COMPARATIVE EXAMPLES 5 AND 6, AND REFERENCE EXAMPLE 1

For the purpose of examining the amount of oxygen invading into the bag during the retort treatment, the following tests were carried out.

The laminate A [gas barrier resin/PET] (the laminate obtained in Example 11 in which the PET layer makes a contact with an adhesive layer; the same hereinafter), laminate B [gas barrier resin/PET] (the laminate obtained in Example 16) and laminate C [gas barrier resin/PET] (the laminate obtained in Example 20) were used and the following laminated films were produced by laminating via a dry laminate adhesive in a dry condition.

Laminate A/adhesive/CPP (Example 32)
Laminate B/adhesive/CPP (Example 33)
Laminate C/adhesive/CPP (Example 34)
PET/adhesive/KONy/adhesive/CPP (Comparative Example 5)
PET/adhesive/EVOH/adhesive/CPP (Comparative Example 6)
PET/adhesive/Al foil/adhesive/CPP (Reference example 1)

A pouch with an inner dimension of 100 mm×60 mm was prepared by sealing these laminated films with each other. Then, the pouches were subjected to retort treatments in a retort tank at 120° C. and 1 kg/cm² for 20 minutes and in hot water at 130° C. and 1.5 kg/cm² for 10 minutes. After the treatment, the amount of oxygen invaded in the pouch was quantitatively assayed using gas chromatography. The results are listed in Table 6.

The materials used above are as follows:

PET: Oriented polyethyleneterephthalate film (made by Torey Co., Lumillar™ S10, a thickness of 12 μm)
CPP: Non-oriented polypropylene film (made by Torey Co., Torephan™ NO ZK62, a thickness of 60 μm)
Al foil: Aluminum foil with a thickness of 9 μm
KONy: PVDC coat ONy (made by Toyobo Co., N8110AE, a thickness of 15 μm)
ONy: Biaxial oriented nylon film (made by Unichika Co., Emblem™ RT, a thickness of 15 μm)
EVOH: Film for lamination comprised of saponified ethylene-vinyl acetate copolymer (made by Kurarey Co., Eval™ EF-RT, a thickness of 15 μm)
Dry laminate adhesive: Made by Toyo Morton Co., Adcoat™ Ad-590 (curing agent CAT-10)

TABLE 6

|  | Composition of pouch layer | Amount of oxygen penetrated into pouch layer *1 Retort temperature | |
|---|---|---|---|
|  |  | 130° C. | 120° C. |
| Example 32 | Laminate A/adhesive/CPP | 0.0154 | 0.0180 |
| 33 | Laminate B/adhesive/CPP | 0.0151 | 0.0178 |
| 34 | Laminate C/adhesive/CPP | 0.0156 | 0.0184 |
| Comparative example 5 | PET/adhesive/KONy/adhesive/CPP | 0.129 | 0.213 |
| Comparative example 6 | PET/adhesive/EVOH/adhesive/CPP | 0.248 | 0.426 |
| Reference example 1 | PET/adhesive/AL foil/adhesive/CPP | 0.014 | 0.0127 |

(*1) unit; (cm³(STP)/pouch)

INDUSTRIAL APPLICABILITY

The present invention provides a container for retort packaging for use in such as foodstuffs being resistant to hot water (insoluble in water and boiling water) and excellent in gas barrier property, along with its gas barrier property is stable in hot-water treatment such as retort treatment. The film comprising the resin composition according to the present invention is water resistant, wherein the film is excellent in gas barrier property, has small humidity dependence of the gas barrier property and the gas barrier function is kept unchanged even when the film makes a contact with hot water. In addition, the gas barrier film according to the present invention can be formed into a laminated film with films comprising other resins, providing toughness and sealing property. The film is suitable as packaging materials for the articles, especially articles being subjected to hot-water treatment after packaging, such as article liable to be denaturated with oxygen gas, infusion solutions, foodstuffs and beverages.

We claim:

1. A resin composition having at least the chemical structures (X), (Y) and (Z) described below, wherein the degree of esterification defined by the equation (1) is from 0.01 to 0.5 and the degree of ionization defined by the equation (2) is from 0.01 to 0.9:

chemical structure (X):

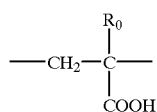

wherein R is H or $CH_3$;

chemical structure (Y):

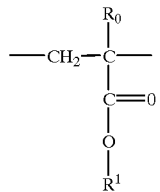

wherein $R_0$ is H or $CH_3$, and
$R^1$ is a residue of a polyalcoholic polymer;

chemical structure (Z);

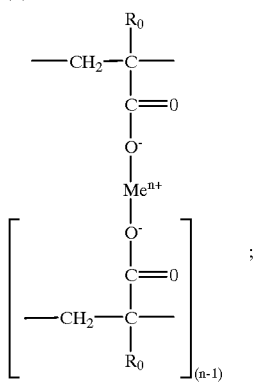

and, optionally, chemical structure ($Z^1$):

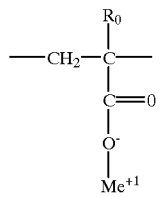

wherein each $R_0$ is independently H or $CH_3$,
$Me^{n+}$ is a n-valent metal ion, and n is 2 or 3, and $Me^{+1}$ is an alkali metal ion;

Degree of esterification=$c/(b+c+d)$ (1)

Degree of ionization=$d/(b+c+d)$ (2)

wherein b, c and d represent molar ratios of carbon-oxygen double bonds in the chemical structures (X), (Y) and (Z) plus ($Z^1$), respectively, of the resin composition.

2. A resin composition comprising a reaction product of poly(meth)acrylic acid (A), a polyalcoholic polymer (B) and a metal (C) as starting materials, wherein said resin composition has at least the chemical structures (X), (Y) and (Z) described below, the degree of esterification defined by the equation (1) is from 0.01 to 0.5 and the degree of ionization defined by the equation (2) is from 0.01 to 0.9:

chemical structure (X):

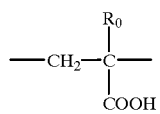

wherein $R_0$ is H or $CH_3$;

chemical structure (Y):

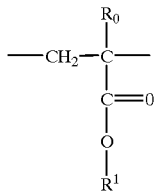

wherein $R_0$ is H or $CH_3$, and
$R^1$ is a residue of a polyalcoholic polymer;

chemical structure (Z);

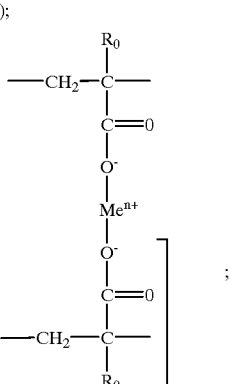

and, optionally, chemical structure ($Z^1$):

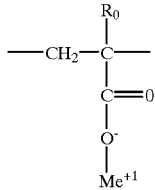

wherein each $R_0$ is independently H or $CH_3$,
$Me^{n+}$ is a n-valent metal ion, and n is 2 or 3, and $Me^{+1}$ is an alkali metal;

Degree of esterification=$c/(b+c+d)$ (1)

Degree of ionization=$d/(b+c+d)$ (2)

wherein b, c and d represents molar ratios of carbon-oxygen double bonds in the chemical structures (X), (Y) and (Z) plus (Z') of the resin composition.

3. A resin composition according to claim 2, wherein the polyalcoholic polymer (B) is polyvinyl alcohol or a saccharide.

4. A resin composition according to claim 3, wherein the saccharide is starch.

5. A resin composition according to claim 1, wherein metal (C) is at least one alkaline earth metal.

6. A resin composition according to claim 5, wherein the metal (C) is magnesium or calcium.

7. The resin composition according to claim 1 wherein $Me^{n+}$ is at least one alkaline earth metal.

8. The resin composition according to claim 2 wherein poly(meth)acrylic acid (A) and polyalcoholic polymer (B) are first reacted to form a reaction product containing chemical structures (X) and (Y) and then the reaction product is reacted with metal (C) to form the resin composition containing chemical structures (X), (Y) and (Z).

9. The resin composition according to claim 8 wherein metal (C) is at least one alkaline earth metal.

* * * * *